United States Patent Office 3,064,409
Patented Nov. 20, 1962

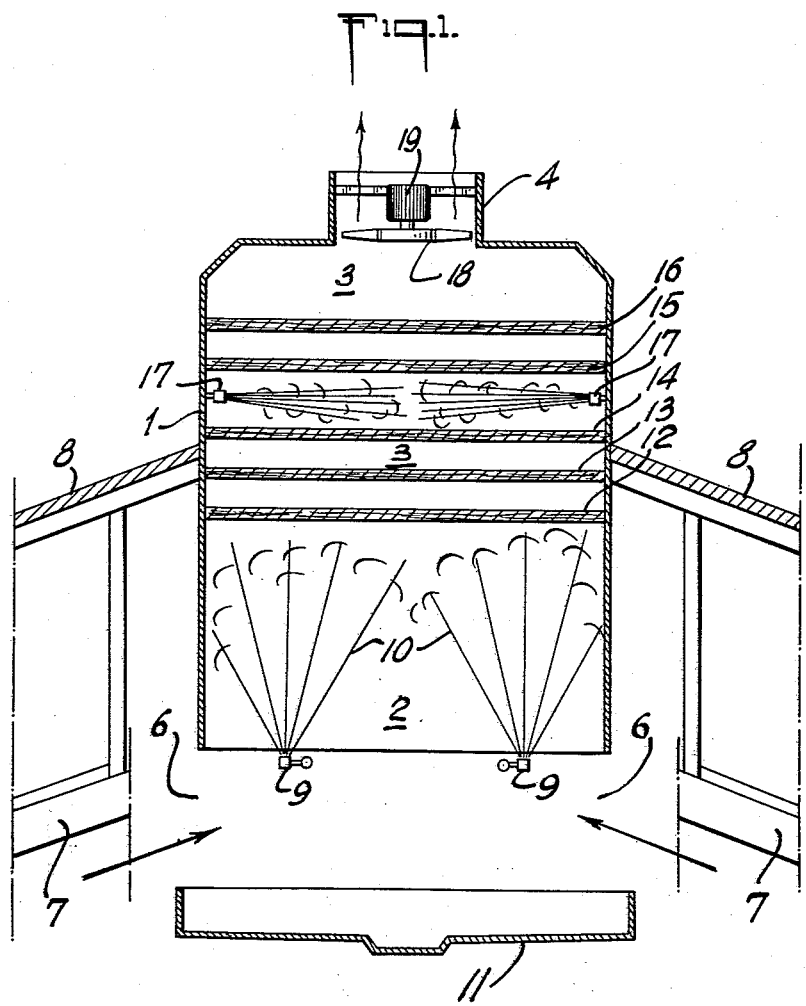

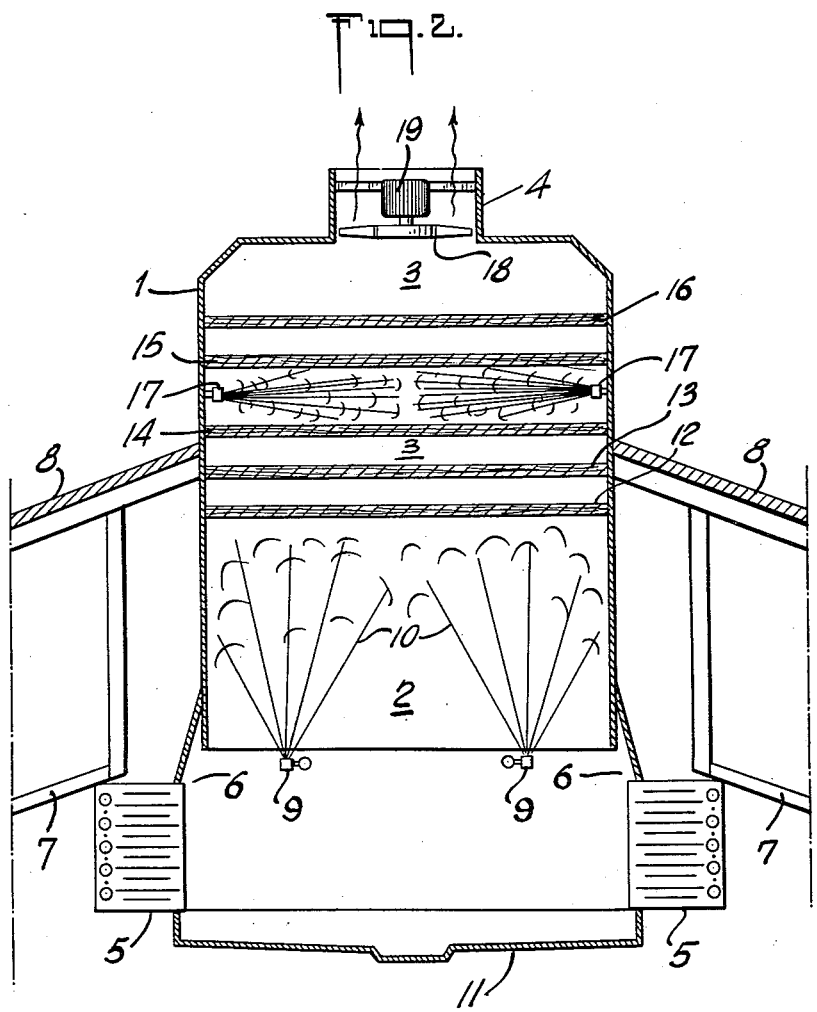

3,064,409
AIR PURIFYING INSTALLATIONS
Johannes Schmitt, Rheinfelden, Baden, Germany, assignor to Aluminium-Industrie-Aktien-Gesellschaft, Chippis, Switzerland, a corporation of Switzerland
Filed Feb. 19, 1960, Ser. No. 9,814
Claims priority, application Switzerland Feb. 27, 1959
2 Claims. (Cl. 55—122)

It is known to purify air, which has been contaminated with gases and escapes from factory buildings in which a number of furnaces are installed, by allowing the contaminated air which rises owing to its thermal buoyancy to pass through shafts which are built into the roof of the building and into which pure water or an absorbent solution, for example caustic soda liquor, is sprayed. The dust, and in some cases also the tar contained in the furnace gases is deposited and soluble constituents are absorbed in the water or in an absorbent solution. These installations are termed "roof spraying installations" in many factories.

Factory buildings in which aluminum electrolysis cells are installed are frequently provided with roof spraying installations of this kind. These installations, in general, have efficiencies of only 70 to 80% as regards removing the fluorine-containing waste gases from the aluminum electrolysis. Their purifying effect on dust and tar vapours is in general still less and amounts to only about 30 to 50%.

These roof spraying installations have the further disadvantage that their action is frequently strongly affected by weather conditions. For example, in strong sunlight the difference between the temperature of the waste gases and fumes escaping from the furnaces and that of the air which is mixed with these waste gases and escapes from the spray chambers is relatively small. Therefore, the thermal buoyancy is not sufficient to conduct all the waste gases through the shafts in the roof and a part escapes through lateral openings in the building. The same effect is observed when the barometer is low, because the thermal buoyancy is also less than when the barometer is high. The efficiency of the roof spraying installation is considerably impaired in squally windy conditions because the wind may cause a down draft in the shaft which interferes with the escape of the waste gases.

My present invention relates to an installation for purifying the waste gases in factory buildings in which the waste gas and air are also sprayed with water or an absorbent solution but in which the spraying device co-operates in a novel manner with other apparatus, namely a fan in such a manner that the purifying effect of the installation is very greatly increased not only as regards the removal of harmful gases but also of the finest particles of dust and tar.

The installation of my invention comprises two or more shafts which are built into the highest part of the roof of the building, for example in the ridge, and project partly above the roof; alternatively a single shaft may extend along the entire length of the roof. A collecting vessel for the water or absorbent solution which is sprayed into the shaft and drips down is arranged under the shafts or shaft. In the lower part of the shaft is a spray chamber, and the upper part of the shaft contains one or more mechanical filters. The term "mechanical filters" is to be understood to mean mechanically acting filters and not electrically acting filters. Chimneys of round cross-section and preferably cylindrical are placed on the top of the shafts. The height of these chimneys need not be very great. In many cases it is sufficient if the ratio of the height of the chimney to its diameter, or average diameter, is about 1:2. The shape of the chimney, for example, can be that of a fan ring. In each of these chimneys is fitted a horizontal axial fan, the blades of which sweep through practically the entire internal cross-section of the chimney. The axial fans cause the air from the building, which is contaminated with waste gases and fumes and rises owing to its thermal buoyancy, to flow at high speed out of the chimneys. The openings for the entry of the impure air into the shaft are formed in the lower part of the shaft and preferably at two opposite sides of the spray chamber. By fitting a conical funnel which widens in an upward direction, the power required for the motor driving the fan can be somewhat reduced for a given velocity of flow in the shaft.

Mechanical filters or electric filters can be arranged in the lateral inlet openings to the spray chamber. The filters may extend across the entire opening in order to effect a preliminary purification by removing dust and/or mist constituents from the air. The term "electric filters" is to be understood to comprise all kinds of electrostatic filters such as pre-ionisers followed by separate plate elements.

One or more layers of mechanical filters are disposed horizontally in the filter chamber in the upper part of the shaft. These consist, for example, of acid-resistant artificial fabric which is stretched on frames. If there are two or more filters, spray nozzles can be arranged at the side walls of the shaft between two superimposed filters, so that water can be sprayed on the filters from the nozzles. If there are more than two layers of filters, spray nozzles may, of course, be arranged in more than one of the spaces between the filters. For example, if there are five filter layers, two, three or all four of the intervening spaces can be provided with spray nozzles.

An air purifying installation in accordance with my invention is, therefore, constructed as follows.

The lower part of a shaft which is built into the highest part of the roof of the building is in the form of a spray chamber in which one or more series of upwardly directed spray nozzles are arranged, so that water or an absorbent solution can be sprayed from the nozzles under pressure. The direction in which the water is sprayed into the spray chamber should, in general, be the same as the direction of flow of the air, that is to say from bottom to top, whereby the thermal buoyancy of the gases is assisted by a kind of injector effect. At the bottom of the spray chamber, preferably at both the sides of the spray chamber which are parallel to the ridge or the highest part of the roof inlet openings are provided for the upwardly flowing air which is mixed with waste gases from the furnaces. The bottom of the chamber is formed by a vessel having an outlet for the water which drips down after being sprayed from the spray nozzles. Above the spray chamber is the filter chamber having air outlet openings at the top, the openings being in the form of chimneys of round cross-section and containing axial fans or ventilators.

The air purifying installation according to my invention is characterised by the following further features.

(1) The height of the filter chamber is at least 0.4 times and at the most 1.5 times, preferably 0.45 to 0.9 times the height of the spray chamber. In this connection the height of the spray chamber is to be taken as the distance from the upper edge of the inlet openings to the lowermost filter.

(2) The horizontal cross-sectional area of the shaft containing the spray chamber and the filter chamber is at least 5 times and at most 25 times, preferably 10 to 17 times, as great as the cross-sectional area of the round chimney from which the purified air escapes and which is superimposed on the shaft and contains the axial fan. The shaft is preferably rectangular in cross-section. In this connection the cross-sectional area of the shaft is to be taken as the cross-sectional area of the space in which the air flow is taken up by the axial fan above the filter chamber. When the shaft is parallel to the ridge of the roof and is very long, two or more chimneys with fans can be superimposed on the shaft in order to maintain the above cross-sectional relationship, in which case the above-mentioned cross-sectional ratio between the chimney and the shaft containing the filter and spray chambers applies to each chimney.

(3) The total cross-sectional area of the air inlet openings of a shaft is preferably 1/3 to 4/5 of the horizontal cross-sectional area of the shaft whether mechanical filters or electrical filters are inserted in the openings or not. The openings must be such that the velocity of the air in the inlet openings and in the chimney prevents the mist in the spray liquid from escaping.

The following example will explain my invention.

Two parallel rows each having 17 open aluminum electrolysis furnaces each working at a current strength of 37,000 amps. are installed in a building. The volume of the air in the building amounts to 22,000 cubic metres and its length to 130 metres.

Three air purifying installations each conssiting of an assembly of five individual shafts having a spray chamber and three frames with mechanical double filters of polyvinyl chloride fabric are arranged in a row in the roof of the building. At the side walls of the shaft between the middle and the lower filter frames spray nozzles are inserted by means of which the middle and the lower filters are sprayed. Each purifying installation has an internal width of 4 metres and an internal length of 25 metres. Consequently, each individual shaft has an internal length of 5 metres. Electric filters are arranged in the lateral inlets to the spray chamber. The inlets are 1.2 metres in height and rectangular in cross-section and are provided on both those sides of each individual shaft which are parallel to the ridge of the building. The electric filters extend over the entire internal cross-section of the inlet openings and effects a preliminary purification from dust and tar of the air which enters the spray chambers.

On each of the three installations are arranged 5 cylindrical chimneys of 1.4 metres internal diameter and 0.7 metre in height. Axis fans each having an output of 60,000 cubic metres per hour are arranged in the chimneys. The axial fans produce a suction of only about 5 mm. water column, but this is sufficient in combination with the thermal buoyancy to ensure a constant change of air in the building which is independent of weather conditions. Therefore, 3 x 5 x 60,000 m.³, that is to say 900,000 m.³ of air from the building flows through the three purifying installations per hour, and this amount of air, after being purified in the electric filters, in the spray chamber and in the filter chamber, is delivered into the atmosphere with an outlet speed of about 14 m./s. The air in the building is, therefore, renewed approximately 40 times per hour.

The cross-section of the air flow to each axial filter in the purifying installation in 20 m.²; the internal cross-section of the chimney is 1.54 m.². The cross-section of the air flowing through the shaft to the axial fan is, therefore, 13 times as great as the cross-section of the chimney. The height of the filter chamber is 1.8 m. and the height of the spray chamber measured from the upper edge of the lateral air inlet openings to the lowest filter is 3.30 m. In this case, therefore, the height of the filter chamber is approximately 0.55 times the height of the spray chamber.

In calculating the cross-section of the air inlet openings, it is the entire free cross-section of the electric filters which has to be taken into account. The space occupied by frames, wires and plates of the electric filter must therefore be deducted.

The velocity of the air in the free cross-section of the electric filters which, at the same time, form the inlet openings to the spray chamber, amounts to approximately 2.0 metres per second.

About 25 cubic metres of water are sprayed per hour into each of the three air purifying installations. The outlet velocity of the droplets of water from the nozzles is about 4.75 metres per second.

The blades of the axial fan are located at a distance of from 4 to 5 centimetres of the lower edge of the chimney.

Two constructional embodiments of an air purifying installation in accordance with the invention are illustrated, by way of example, in the accompanying drawings, in which FIGURES 1 and 2 are cross-sections through the ridge of the roof of the building showing the installation built into the ridge.

FIGURE 1 shows an installation having an air purifying shaft 1, a spray chamber 2, a filter chamber 3 and chimney 4.

FIGURE 2 shows the same shaft but having electric filters 5 in the inlet openings 6 to the spray chamber.

In both embodiments the height of the spray chamber 2 is 2.4 metres and its cross-section is 4 x 5 metres, the distance apart of the walls in which the inlet openings 6 are formed being 4 metres.

The inlet openings 6 are disposed adjacent the inclined roof lining 7. The height of these openings is 1.2 metres and the length 5 metres. The roof covering is designated by the numeral 8. Nozzles 9 are arranged in two rows in the spray chamber 2. The water jets which are indicated by the reference numeral 10 are ejected in approximately the same direction as that in which the air flows through the spray chamber. The liquid which drops down is collected in a collecting vessel 11 which is provided with outlet pipes which are not illustrated in the drawing. The filter chamber 3 is 2.7 metres high and has approximately the same cross-section as the spray chamber 2 and is provided with mechanical filters 12, 13, 14, 15 and 16, each of which consists of a frame over which a polyvinyl chloride fabric is stretched on both sides. A series of slot nozzles 17 is arranged on both the longitudinal sides of the filter chamber between the filters 14 and 15 and water is ejected from them in an approximately horizontal direction. An axial fan 18 is fitted in the chimney 4 which is of circular cross-section and has an internal diameter of 1.4 metres and a height of 0.7 metre. The fan 18 is driven by an electric motor 19. The fastening devices for the nozzles 9 and 17 and those for the motor 18 are not illustrated in the drawing which is purely diagrammatic.

The air from the building which flows upwardly through the air purifying shafts contains, before entering the shaft, only a few mg./Nm.³ (milligrams per cubic meter at normal atmospheric pressure and temperature—i.e., standard conditions) of fluorine-containing gases and tar and a few mg./Nm.³ of dust. In spite of the extremely large amount of air which flows through the purifying shaft 1, it is possible to remove the aforesaid constituents from the exhaust air from the building with the apparatus described with an efficiency of 90% and above this.

The efficiency of the purifying installation of the invention can possibly be explained as follows.

Since the cross-section of the air outlet opening is greatly reduced in comparison with the cross-section of the shaft, the air velocity in the filter chamber vertically below the axial fan is very much greater than in the edge zones of this chamber. Therefore, air eddying or turbulence is caused to take place in the edge zones by which the water sprayed from the nozzles is continually thrown upwards; also in consequence of the high velocity of the air in the interior of the filter chamber and the lateral eddying of the air, the fabric filters are continuously and vigorously sprayed, so that the fabric is covered with a coherent film of water. Owing to the arrangement of the lateral spray nozzles between the filters, this spraying of the filters is intensified. The lateral spraying alone is, however, not sufficient to produce the aforesaid water film on the fabric filters. The edge zones referred to are the peripheral spaces which are situated around the space occupied by the current of air produced by the axial fan.

On passing through the filters which have been moistened in the above-described manner, the air is freed by the water film from water droplets and residual dust particles as well as from tar droplets formed from the tar vapours cooled in the spray chamber. When electric filters are arranged in the inlet openings to the spray chambers, a thorough pre-cleaning of the air from dust and tar takes place before it enters the spray chamber. In this case, the air which flows through the filters is freed from the last remanents of the aforesaid constituents mainly by the water droplets contained therein.

The cross-section of the filter chamber preferably corresponds in size and shape substantially to the cross-section of the spray chamber. The air velocity which depends on the amount of air which is sucked out per hour and on the cross-section of the spray chamber, should not exceed a certain limit if favorable cleaning and absorption conditions are to be obtained, and this again must bear a certain relation to the velocity of the water droplets which are thrown upwards from the nozzles in the spray chamber. When the water droplets emerge from the spray nozzles they have a much higher velocity than the current of air into which they are flung in approximately the same direction of flow. As long as the velocity of the droplets is greater than that of the current of air, the particles of dust contained in the air stream will be caused to be deposited by the water droplets. The greater the distance of the water droplets from the range of the spray nozzles the more is their velocity reduced until they finally have the same velocity as the current of air, they then fall down into the collecting vessel after a further diminution in velocity. The time of contact between the air stream and the water droplets during which they have approximately the same velocity should be as long as possible, because the absorption of the water-soluble gases by the droplets takes place mainly during this period and the air is thereby freed from harmful waste gases. This time of contact is prolonged by the eddying or turbulence.

When the ratio of the height of the filter chamber to the height of the spray chamber is in accordance with the invention, not only is a certain amount of eddying of the air caused to take place in the edge zones of the filter chamber, but this eddying extends into the upper part of the spray chamber and effects in the upper part an intimate intermixing of the air stream with the water droplets in the spray mist. The action which takes place in the upper part of the spray chamber is, therefore, similar to that of a stirring mechanism. In this way, the water-soluble gases contained in the air stream are washed out an improved extent and the efficiency of the spray chamber is increased. On the other hand, the water jet in the region of the spray nozzle should be interfered with as little as possible by this eddying in order that the injector effect may be maintained. It is only by maintaining the aforesaid height ratio that the injector effect in the lower part of the spray chamber is maintained and no eddying of the air takes place in this section.

The axial fans fitted in the outlet openings stabilize the air flow conditions in the shaft and to a large extent prevent its action being affected by changing weather conditions. Since the object of the axial fans is to effect a stabilization of the change of air in the building in combination with the thermal buoyancy, the suction effected by the fans need not be great and the power of the motor for driving the fans is within reasonable limits.

Finally, the arrangement of the chimneys with the axial fans built into them has the following further advantageous effect.

With open shafts which work without fans, the waste air which still contains residual fumes escapes from the building in coherent clouds. These clouds can, in some circumstances, cause considerable damage to agriculture. On the other hand, when axial fans are fitted in the shaft the waste air containing minimum quantities of impurities is conveyed upwardly at high velocity and is distributed into the atmosphere without any cloud formation.

What I claim is:

1. An installation for purifying air containing smoke and fluorine compounds in buildings, for example, buildings containing aluminum electrolysis furnaces, comprising at least one vertical shaft which is built into the roof of a building and projects partly above the roof, a collecting vessel at the bottom of the shaft and provided with an outlet, the shaft having lateral air inlet openings at a lower portion thereof, upwardly-directed spray nozzles located in the vicinity of the level of the upper edges of the lateral air inlet openings, the upper part of the shaft providing a filter chamber in the form of a vertical conduit for the upward movement of gas, a plurality of vertically-spaced horizontally-arranged mechanical filters in said conduit and each extending transversely over the entire internal cross-section of the conduit, spray nozzles directed horizontally and generally parallel to said filters and transversely of said conduit and disposed in the space between two of the filters whereby water may be sprayed horizontally in the space between said two filters, a round chimney at the top of the shaft, and a horizontal axial fan disposed in said chimney, the height of the filter chamber being at least 0.45 times and at most 0.9 times the distance between said upwardly-directed nozzles and the lowermost of said filters.

2. An air purifying installation according to claim 1, in which electric filters are installed in the air inlet openings in advance of all spray nozzles so that they will operate on dry air.

References Cited in the file of this patent

UNITED STATES PATENTS

| | | |
|---|---|---|
| 2,259,626 | Erikson | Oct. 21, 1941 |
| 2,273,194 | Hedberg et al. | Feb. 17, 1942 |
| 2,342,689 | Pennington | Feb. 29, 1944 |
| 2,357,354 | Penney | Sept. 5, 1944 |
| 2,471,724 | Christensen | May 31, 1949 |
| 2,631,688 | Osborne et al. | Mar. 17, 1953 |
| 2,907,263 | Muller | Oct. 6, 1959 |
| 2,997,132 | Allander et al. | Aug. 22, 1961 |

FOREIGN PATENTS

| | | |
|---|---|---|
| 29,346 | Great Britain | Dec. 30, 1911 |
| 500,775 | France | Jan. 6, 1920 |